Patented Sept. 27, 1927.

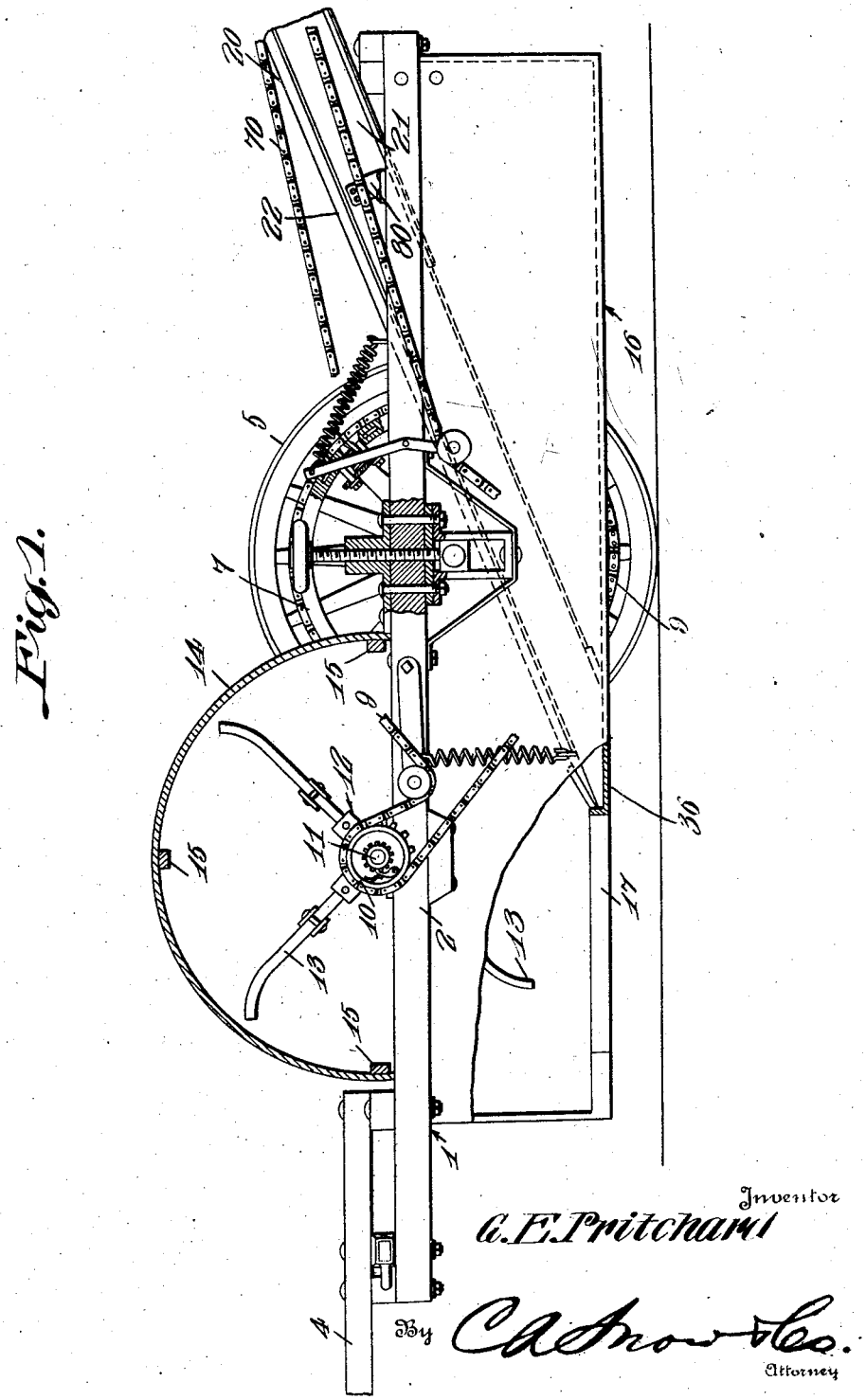

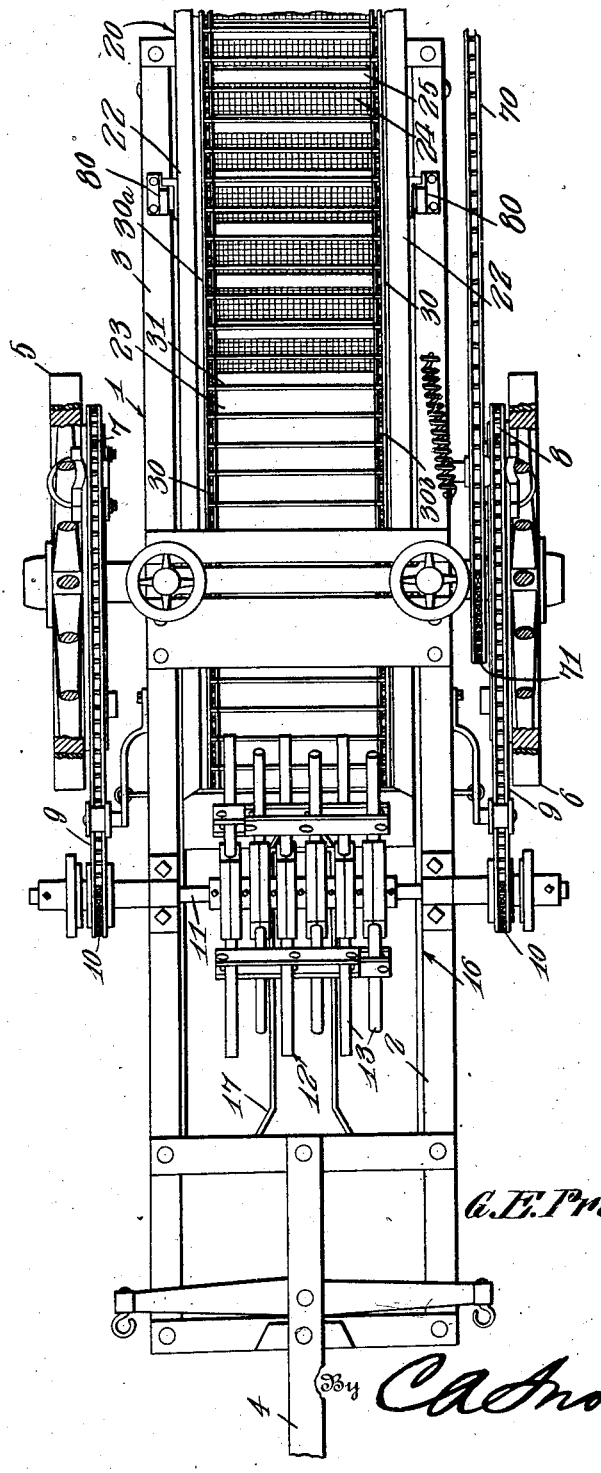

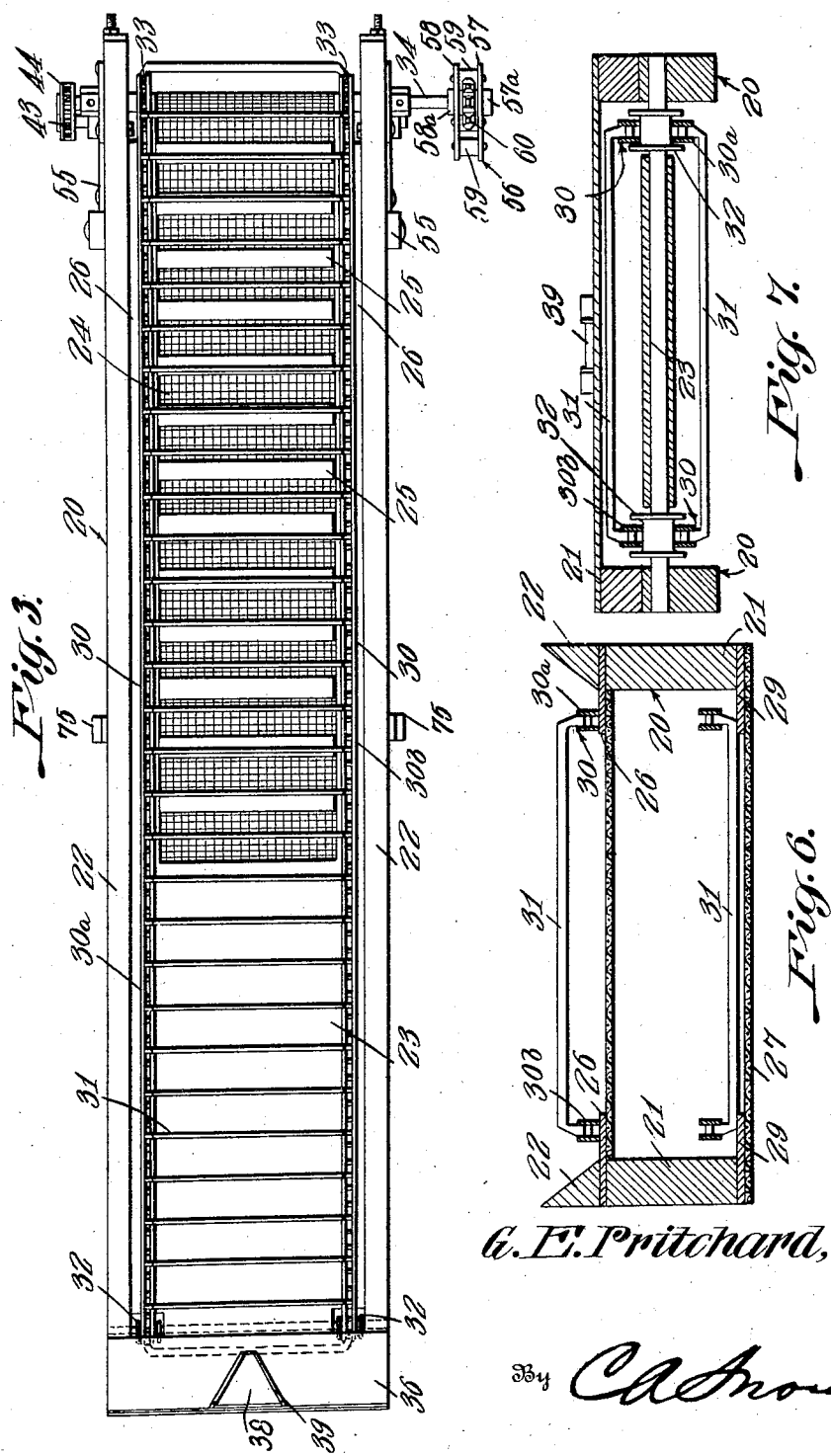

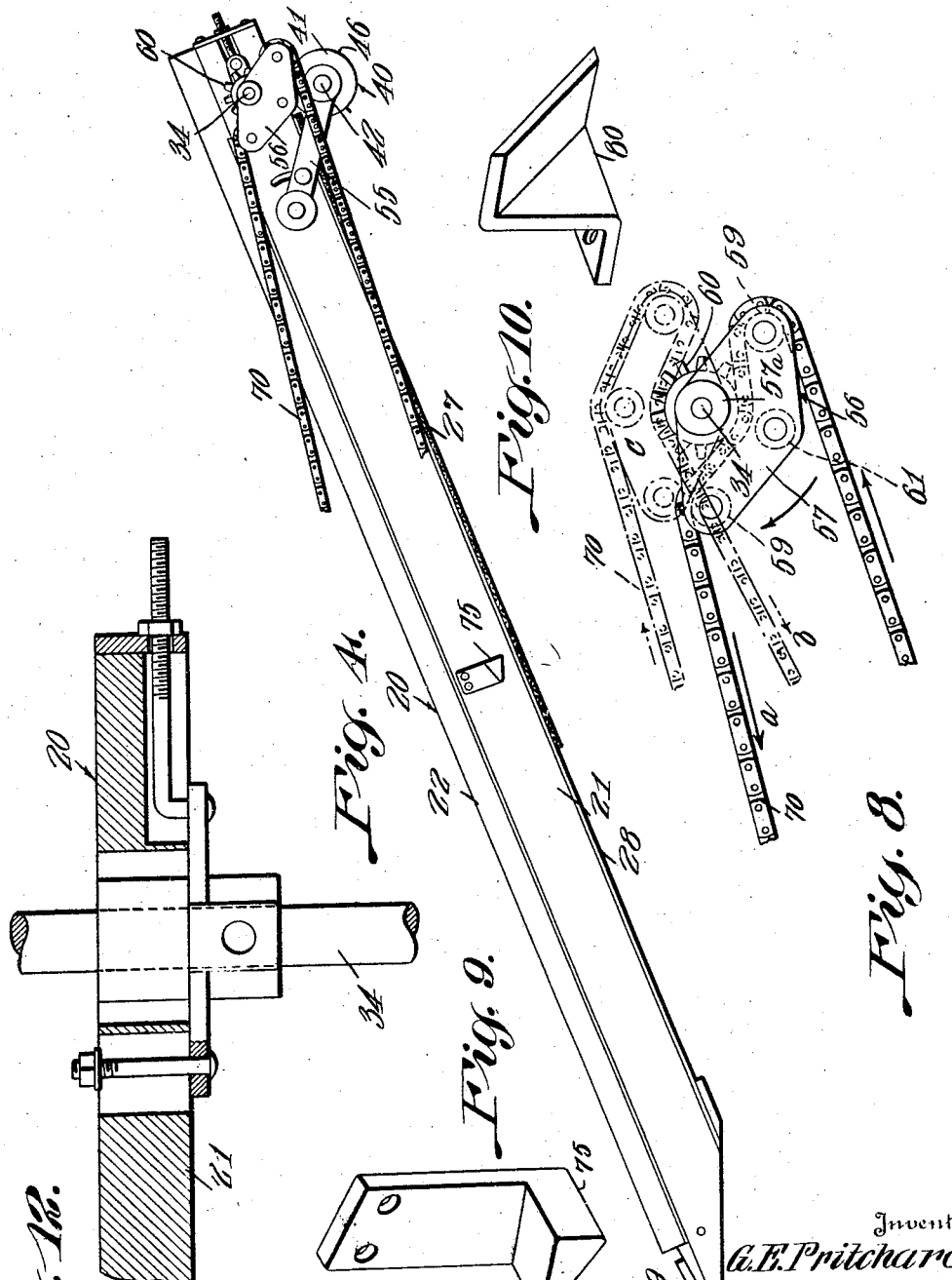

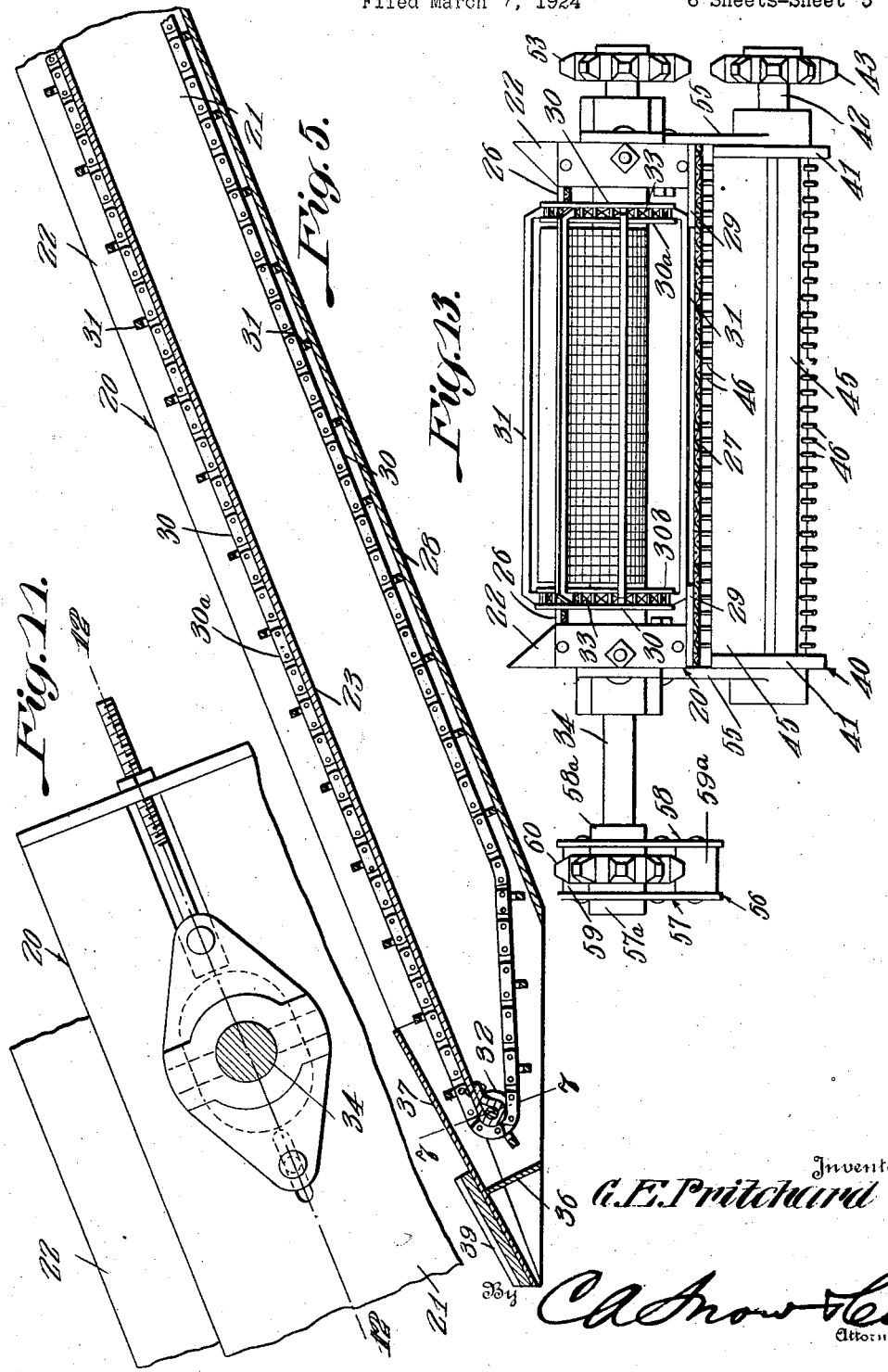

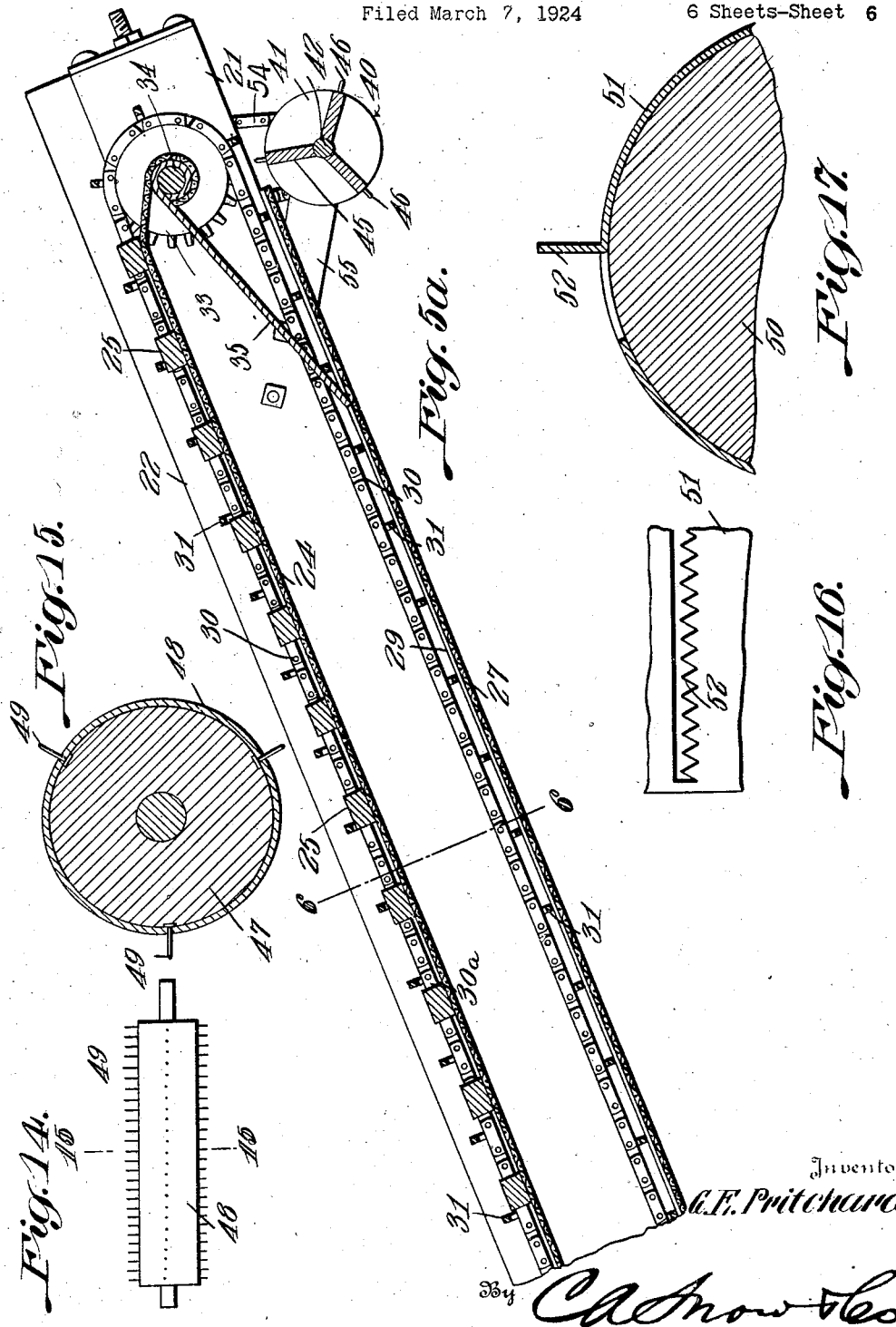

1,643,629

UNITED STATES PATENT OFFICE.

GEORGE EDWARD PRITCHARD, OF ELIZABETH CITY, NORTH CAROLINA.

SEPARATOR ATTACHMENT FOR BEAN HARVESTERS.

Application filed March 7, 1924. Serial No. 697,615.

This invention relates to machines for harvesting and threshing peas and beans of the type adapted to be drawn over a field and provided with means to direct the vines into the machine, strip the peas from the plants and then separate the peas from the refuse.

The object of the invention is to provide a separator for a harvester of this character so constructed that the beans thrown by the threshing reel thereon are thoroughly screened and the chaff and hulls evenly distributed on the ground to prevent interference with the coming crops.

Another object is to provide an automatically operated attachment of this character which requires no attention on the part of the driver thereby producing a thoroughly efficient one man harvester.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:—

Figure 1 represents a side elevation with parts broken out and in section of a harvester equipped with this improved separator.

Fig. 2 is a top plan view thereof with the wheels broken off and in section and the separator broken off for convenience in illustration.

Fig. 3 is a plan view of the separator attachment detached.

Fig. 4 is a side elevation on a small scale of the separator attachment.

Fig. 5 is a longitudinal section of the lower or inner portion of the separator attachment.

Fig. 5ª is a view similar to Fig. 5 of the upper or outer portion of the separator attachment which forms a continuation of the portion shown in Fig. 5.

Fig. 6 is a transverse section taken on the line 6—6 of Fig. 5ª.

Fig. 7 is a similar view taken on the line 7—7 of Fig. 5.

Fig. 8 is a side elevation of the chain supporting mechanism which permits the machine to be backed at the turning of corners and rows without reversing the direction of the conveyor.

Fig. 9 is a detail perspective view of one of the attaching clips.

Fig. 10 is a similar view of another.

Fig. 11 is a detail sectional view.

Fig. 12 is a longitudinal section taken on the line 12—12 of Fig. 11.

Fig. 13 is an end elevation of the separator attachment.

Fig. 14 is a side elevation of one of the rollers employed in connection with the separator.

Fig. 15 is an enlarged transverse section taken on the line 15—15 of Fig. 14.

Fig. 16 is a detail plan view of another form of roller showing saw teeth in the position they assume before being bent outwardly; and Fig. 17 is an enlarged detail transverse section of the roller shown in Fig. 16 after the teeth have been bent out for use.

The harvester shown in connection with this separator is the same as that llustrated in my copending application Ser. No. 586,472, filed Sept. 6, 1922 now matured into Pat. No. 1,571,491. This harvester includes a body supporting frame 1 composed of side and cross bars 2 and 3 respectively with a tongue 4 extending from the front of the frame to be used in drawing the machine over the field. The machine is equipped with the usual driving wheels 5 and 6 on the inner faces of which are mounted sprocket gears 7 and 8 over which operate sprocket chains 9 which also operate over sprockets 10 carried by a transversely extending shaft 11 on which shaft is mounted the threshing reel 12, the fingers 13 of which are designed to rake off the beans and throw them backwardly onto the separator constituting this invention and which will presently be described.

A hood 14 is arranged over the threshing reel to protect the fingers thereof and prevent the beans from being thrown out by these fingers. A plurality of cleats 15 are carried by the inner face of this hood to operate as retarders for preventing the beans from being carried round and round by the fingers and passing out through the door of the machine onto the ground.

A body 16 depends from the frame 1 and has a flanged opening 17 in the front portion of the bottom thereof through which the vines and stalks of the beans pass, the beans being raked off by the fingers 13 and conveyed backwardly onto the separator.

The separator 20 constituting this invention which is designed for use in connection with the harvester extends down into the body 16 to a point below the threshing reel as is shown clearly in Fig. 1.

This attachment comprises side bars 21 connected by a smooth plate 23 for a portion of their length in advance of which plate is arranged a separator screen 24 having longitudinally spaced transversely extending cleats 25 disposed on its upper face to prevent the beans or peas from being fed too rapidly over the screen so that they will have ample time to drop through the screen. Arranged along the upper edges of the side members 21 are beveled guides 22 inclined downwardly and inwardly to prevent the beans or peas from falling over the edges of the attachment. The cleats 25 in addition to forming retarders for the beans also operate to cause the vines and chaff to turn over as it strikes against the cleats and thus allows the beans to work to the bottom.

Arranged along the sides of the attachment over the screen 24 are thin sheet metal tracks 26 for the chains 30 to run over and prevent wear on the screen as well as on the plate 23. Arranged below the screen 24 is another screen 27 the lower end of which extends beyond the lower end of screen 24 and merges into a smooth imperforate plate 28 which is designed to receive the chaff which does not pass through the lower screen and where it may be picked up by the endless conveyor which directs it up onto the upper plate 23 to be again carried over plate 23 and screen 24 and discharged at the rear end of the attachment. A track 29 similar to track 26 is arranged to receive the lower stretch of the drag chain to prevent the chain from wearing out the lower screen 27 and the plate 28.

The drag chain 30 comprises two sprocket chains 30ª and 30ᵇ which are designed to travel over the tracks above referred to and are connected by cross bars 31 designed for conveying or dragging up the beans with the vines and chaff to be separated by the screens. These cross bars 31 are spaced slightly above the plate 23 and the upper screen 24 so as to allow the beans or peas to settle down close to the screen. These bars when they pass over the lower screen 27 and plate 28 run in close proximity thereto so as to brush the smaller chaff down to the front end of the attachment where it is returned to the top screen 24 by the conveyor.

These drag chains 30ª and 30ᵇ run over idle rollers or sprockets 32 at the lower end of the attachment and are driven by sprockets 33 fixed to a shaft 34 located transversely at the upper end of the attachment and which is driven by a chain 70 which passes around a sprocket wheel 60 on one end of shaft 34 and around another sprocket 71 carried by the axle of the harvester.

A shield 35 has one end rolled around the shaft 34 and inclines downwardly and forwardly resting at its free end on the screen 27 and is designed to direct onto said screen the beans or peas which fall through the upper screen 24. The top screen 24 also has its upper end bent around shaft 34.

A dash pan 36 is located at the lower end of the attachment for guiding and directing the beans up onto the plate 23 over which the drag chain 30 operates and prevents the beans from remaining in the pocket in which the idle sprockets 32 run. A beveled edge cleat 37 is secured to the lower end of plate 23 and is just thick enough to come up under the edge of the cross bars 31. The pan 36 has a V-shaped opening 38 therein the tapered portion extending toward the rear and on each side of which is a flange 39 to prevent the beans and peas when threshed from the vines from falling through the opening 38 and guides them onto the conveyor.

A distributor 40 is mounted at the upper end of the attachment where the drag chain passes over the sprocket wheels 33 and is designed to remove the trash in the form of vines and chaff from the bars 31 to prevent its passing onto the lower screen. This distributor 40 also operates to distribute the refuse evenly over the ground. The form of distributor shown in Fig. 5ª comprises end disks as 41 mounted on shaft 42 which is driven by a sprocket 43 over which passes a chain 44. The heads or disks 41 of the distributor 40 are connected by bars or plates 45 in the outer edges of which are pins 46 any desired number of which may be employed and which operate as rakes to remove the trash from the drag chains.

In Figs. 14 and 15 a different form of distributor is shown composed of a roller 47 covered by a sheet metal cylinder 48 from the periphery of which extend pins 49 here shown arranged in radially spaced rows and which operate in the same manner as the pins 46 of the distributor 40.

In Figs. 16 and 17 still another form of distributor is shown comprising a roller 50 covered with sheet metal 51 from which is struck a plurality of saw teeth 52 bent outwardly at right angles to the cover 51 as shown in Fig. 17 and which operate in the same manner as the teeth of the other distributors.

A sprocket 53 is fixed to one end of the shaft 34 and a sprocket chain 54 passes over this sprocket and the distributor driving sprocket 43 so that when shaft 34 is rotated the distributor will be correspondingly turned.

The distributor 40 is mounted in hangers 55 adjustably mounted on the side members 31 so that the distributor may be moved toward or away from the drive chain to insure the removal of the refuse therefrom.

Mounted to turn freely on the end of shaft 34 opposite to that which carries the sprocket 53 is a reversing block 56 shown in Figs. 4, 8 and 13. This block 56 is constructed similar to a pulley block being composed of two oblong plates 57 and 58 here shown substantially diamond-shaped and between which is mounted a sprocket wheel 60 which drives shaft 34 over which chain 70 operates.

These plates 57 and 58 have sleeves or hubs 57$^a$ and 58$^a$ loosely mounted on shaft 34 and the ends of the plates are connected by idle rollers 59 and over which the chain 70 passes.

Another idle roller 61 connects plates 57 and 58 intermediate their ends and operates to prevent the two stretches of chains 70 from rubbing together.

An inspection of Fig. 8 will clearly show the operation of block 56 which is designed to permit the harvester to be turned at the ends of the rows, without changing the direction of movement of the drag chains. The block being loose on shaft 34 and chain 70 passed over roller 59 under and in engagement with sprocket 60, then over roller 59$^a$ and back under roller 61, the pull when the machine is moving forward is in the direction of arrow $a$ causing chain to pull tight over roller 59 and the block to swing under shaft 34. When the machine backs the strain or pull is in the direction of arrow $b$ the strain coming on roller 59$^a$ causing the block to follow the path indicated by the dotted lines $c$ onto the top of shaft 24. While the block moves as above described from under to over shaft 34 the conveyor chains stand still and thus permit the machine to be turned at the end of rows without reversing the direction of the conveyor. Of course if the machine were to continue to back after the block passes to the position above shaft 34 the conveyor would reverse.

The attachment 20 is detachably connected to the harvester by inserting the lower end of the attachment into the body of the harvester and engaging wedge-shaped lug 75 carried by the outer faces of the side members 21 of said attachment, with correspondingly shaped pockets 80 on the harvester body. The weight of the attachment will operate to wedge the lugs 75 in said pockets 80 and thus securely hold it connected with the harvester without the use of bolts or the like. To detach the attachment the lugs are simply lifted out of the pockets by moving the attachment rearwardly after first disconnecting the chain 70 from its driving sprocket 71.

In the use of this machine the harvester with the separating attachment attached as shown in Figs. 1 and 2 is drawn over the rows of beans or peas to be harvested the vines entering the flanged opening 17 in the front of the bottom of the harvester body and the rotation of the reel 12 which is incident to the turning of the wheels 5 and 6 causes the fingers 13 of said wheel to strike the bean pods with sufficient force to thresh the beans out of the pods and deliver both into the machine carrying them around with the reel, delivering both the hulled beans and the vines, hulls, chaff and the like onto the separating attachment, the conveyor of which receives them and carries them up onto the top screen 24. The beans are sifted through the meshing of the screen and fall onto screen 27 below it while the refuse passes out from the end of the separator. Peas delivered onto screen 27 pass through the mesh thereof into a suitable receptacle or into the body of the harvester while the chaff is carried by the conveyor down over the plate 28 back up over the upper stretch of the conveyor and is discharged from the outer end of the separator.

It is of course understood that when desired the separator may be removed from the harvester in the manner above set forth and the havester used without it. It is also to be understood that while this separator 20 is primarily designed for use in connection with the harvester herein shown it may be used with other harvesters.

What is claimed is:—

1. A separator for bean harvesters including a frame, spaced upper and lower screens positioned within the frame, transversely disposed cleats secured to the upper screen, a conveyor operating over the screens, said conveyor including arched members adapted to pass over the cleats to carry material thereover, and said arched members adapted to rub the upper surface of the lower screen.

2. In a separator for bean harvesters, a frame, upper and lower inclined screens mounted on the frame, transversely disposed cleats secured to the upper surface of the upper screen, an endless conveyor operating over the screens, said endless conveyor including lateral chains, bars connecting the chains, said bars being substantially U-shaped to operate in spaced relation with the upper screen and clear the cleats in passing over the upper screen, said bars adapted to rub the upper surface of the lower screen, and cleats adapted to retard the movement of material over the upper screen.

In testimony that I claim the foregoing as my own, I have hereto affixed my signature.

GEORGE EDWARD PRITCHARD.